May 12, 1942.   P. E. HAWKINSON   2,282,578
METHOD OF TREADING TIRE CASINGS
Filed April 19, 1940   2 Sheets-Sheet 1
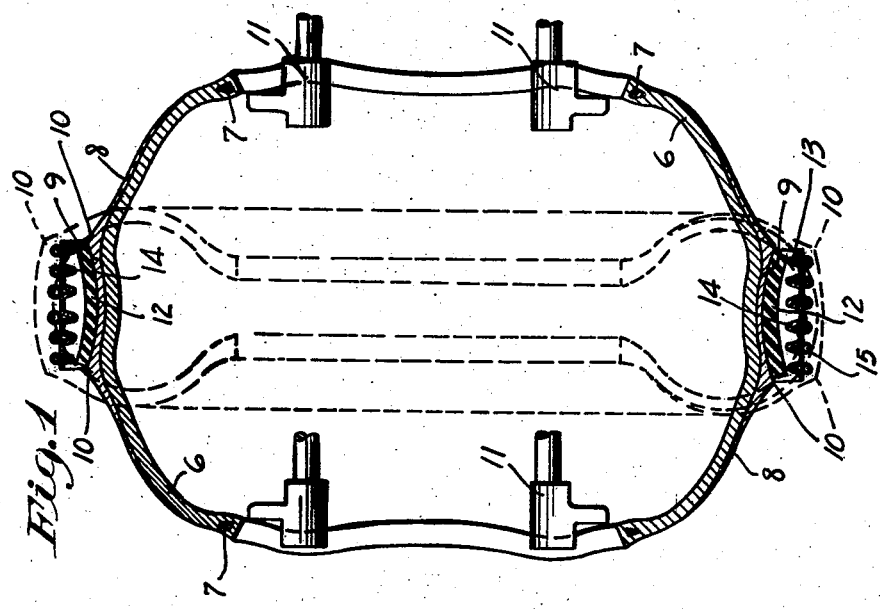
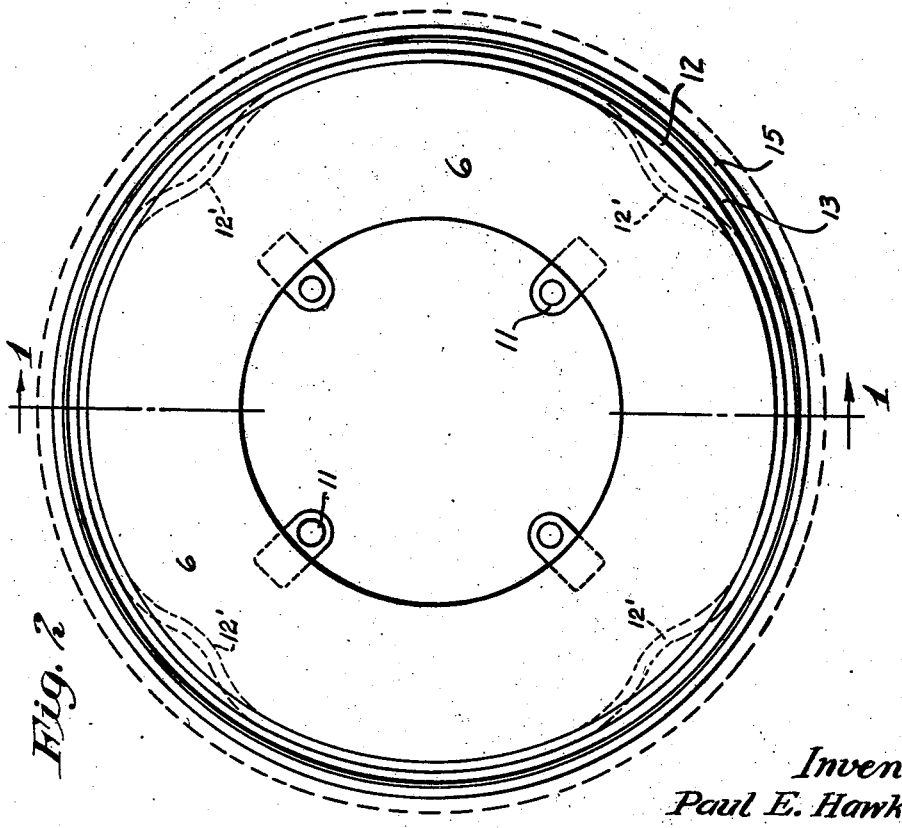
Inventor
Paul E. Hawkinson
By his Attorneys
Merchant & Merchant May 12, 1942.  P. E. HAWKINSON  2,282,578
METHOD OF TREADING TIRE CASINGS
Filed April 19, 1940   2 Sheets-Sheet 2
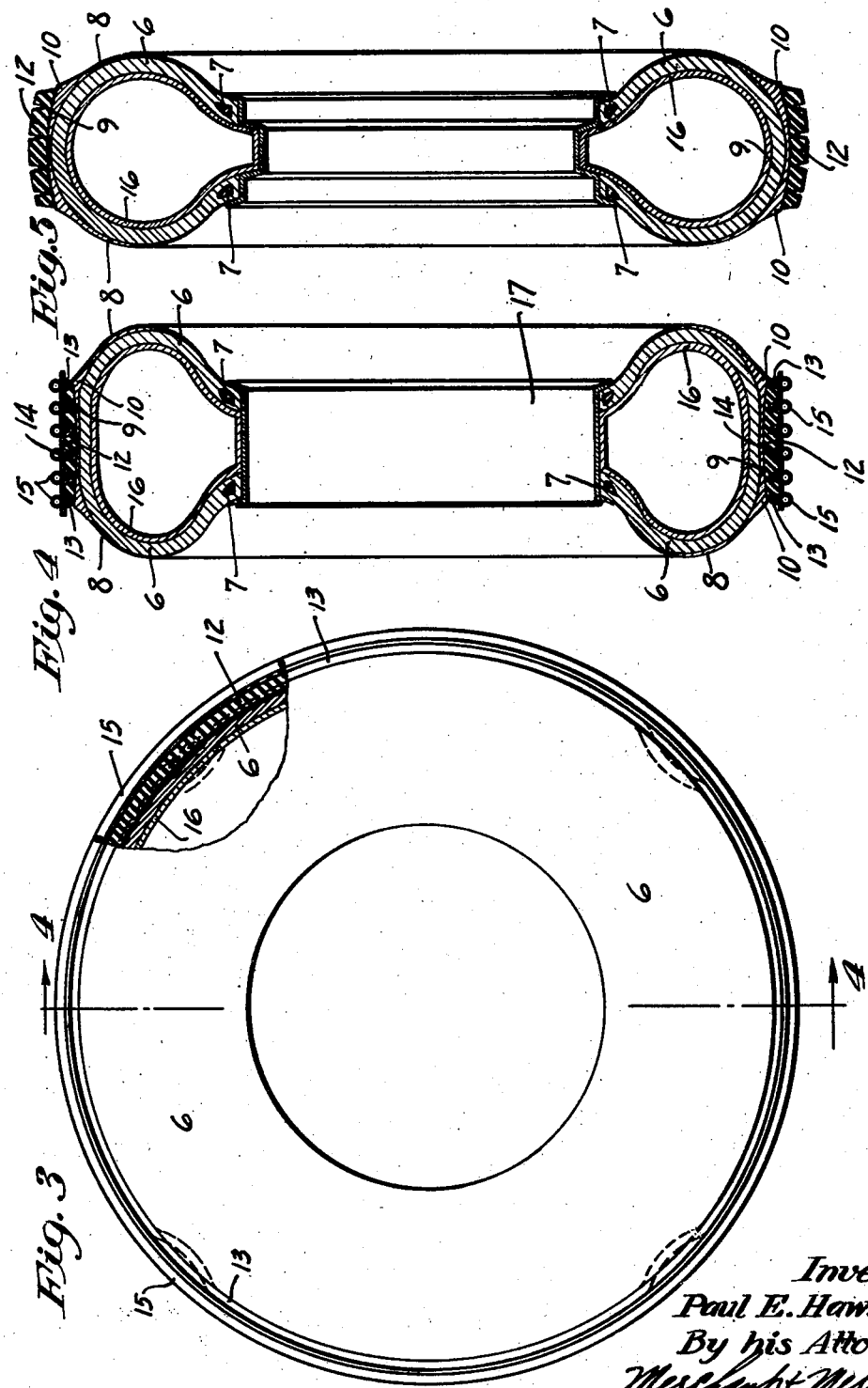
Inventor
Paul E. Hawkinson
By his Attorneys

UNITED STATES PATENT OFFICE 2,282,578

METHOD OF TREADING TIRE CASINGS

Paul E. Hawkinson, Minneapolis, Minn., assignor to Paul E. Hawkinson Company, Minneapolis, Minn., a corporation of Minnesota Application April 19, 1940, Serial No. 330,513

4 Claims. (Cl. 18—59)

This invention relates to improvements in the art of tire treading and particularly pertains to improvements in the treading or retreading of tire casings with processes whereby the road engaging crown tread material of a tire is cured on the casing while the peripheral crown portion of the casing is in a circumferentially and radially contracted condition.

Since the introduction by me of the now well known "Hawkinson system" of tire retreading, which involves the use of methods and apparatus disclosed in my prior Patents 1,917,261 and 1,917,262, it has become a well recognized fact that the treads of retreaded tires, and particularly treads applied over the worn road engaging crown surface of the original tread material, as taught in my prior Patent 1,917,261, will wear longer, roll easier, and create generally less heat in service if the treads are cured on the casing while the newly treaded crown surface of the casing is retained in a radially contracted condition at all points about its circumference. In this connection it should be understood that the carcasses of tire casings, when inflated and unrestrained against outward expansion, assume a normal cross sectionally circular contour under which condition the radial measurement from the axis of the tire casing to the periphery of the tread represents what is known and herein referred to as the normal or expanded radius of the tire; and it should further be understood that the portion of a normally inflated tire casing in engagement with the road under normal load takes on a distorted radially contracted and laterally bulged shape, the radial measure of which from the axis of the tire casing to the central point of engagement with the road is materially less than the normal expanded radius of the tire, this latter radial measurement being known as the rolling radius of the tire casing.

It has become an important objective in the retreading art, particularly as practiced under the "Hawkinson system," to tread tire casings in a materially circumferentially and radially contracted condition wherein the radial measurement of the newly treaded road engaging crown of the casing closely approximates the normal rolling radius of the casing at all points about its circumference, so that when the tread is cured and the casing is inflated, the newly cured tread will be stretched and maintained under tension to contract from a normal or expanded radial condition to approximately its rolling radial condition in which it was cured. Of course, when the treads are cured on in this manner, the tread merely returns to a neutral condition when its radius is reduced under engagement with the road, thereby eliminating the customary tread wave resulting from a displacement of excessive tread material at the point of road contact in tires wherein the tread was cured in a normal or expanded radial condition.

This curing of treads or retreads to the circumferentially very short rolling radius condition requires a very material circumferential contraction of the crown portion of the casing, this being particularly true in very large size low pressure casings, and while such short curing of treads has been practiced with a high degree of success on most of the popular tire sizes, a great deal of difficulty has been encountered when attempting to satisfactorily cure a new tread on very large size tires such as size 12:75—24 (meaning a tire having a cross-section diameter of twelve and seventy-five one hundredths inches and a rim diameter of twenty-four inches) low pressure tires to the approximately rolling radius of the casing. On these large and flexible casings, the difficulty hitherto encountered was a buckling of the treaded crown of the casing under the extreme circumference contraction necessary to bring the periphery thereof down to the rolling radius; such buckling causing the treaded periphery of the casing to distort out of a true circular condition, which in turn resulted not only in curing of the tread in an out-of-round condition, but in an unequal curing pressure being exerted on the new tread material during the curing operation.

To gain the proper understanding of the reasons for this buckling tendency under previous practice, it may be said that the practice hitherto has been to apply the new tread material to the crown of the casing while the casing was in a normal condition and then to contract the casing radially and circumferentially after the tread is applied; such radial contraction usually being brought about either by applying radial pressure to the treaded crown while leaving the side walls of the casing free to expand, or by the more commonly employed method of laterally spreading the beads of the casing while maintaining the same in parallel relation, as taught in my prior Patent 1,917,262. Under either method of circumferential or radial contraction of the treaded crown of large flexible tires such as above described, for example, they tend to become seriously out of a truly circular condition under the extreme contraction necessary to reduce the periphery of the tire down to the rolling radius, and attempts to make the already distorted newly treaded portion of the casing fit and conform to the shape of a truly circular mold often proved futile.

The present invention has as its objective the reduction or elimination of this buckling tendency under extreme circumferential and radial contraction of the periphery of the casing. In accordance with the present invention, this objective is accomplished by an improved method which involves circumferentially and radially contracting the peripheral portion of the casing to approximately the radius in which it will be cured and then applying the new tread material to the periphery of the casing while the casing is retained in the circumferential and radially contracted condition. I have found that the tendency of the crown portion of the casing to buckle along its periphery under extreme circumferential contraction is greatly relieved by the absence of new tread stock, and that this long standing problem of curing treads to a greatly reduced radius is solved by this simple method of contracting the casing first and applying the new tread thereafter.

The objectives and advantages of the present invention will be made clear from the following specification, claims, and appended drawings.

In the accompanying drawings, like characters indicate like parts throughout the several views.

Referring to the drawings:

Fig. 1 is a transverse sectional view taken on the line 1—1 of Fig. 2;

Fig. 2 is a view in side elevation showing by full lines a laterally expanded circumferentially contracted tire casing loosely set in a mold or curing ring, and showing by dotted line the normal or expanded condition of the tire;

Fig. 3 is a view similar to Fig. 2, but illustrating the casing as being equipped with a rim and inner tube and inflated to expand the new tread into engagement with the mold;

Fig. 4 is a transverse sectional view taken on the line 4—4 of Fig. 3; and

Fig. 5 is a view illustrating the completely treaded tire after it is removed from the mold and inflated.

The tire casing illustrated in the drawings is of the conventional character comprising the customary carcass 6 having reinforced beads 7, side wall protecting material 8 of rubber or the like, and a tread material 9 applied over the crown portion of the carcass. The tread material 9 has been worn down by contact with the road so that its road engaging crown surface lying between the laterally spaced edges 10 is transversely relatively flat when the tire is in a normal condition shown by dotted lines in Fig. 1. By reference to dotted and full lines in Fig. 1, it will be seen that the central portion of the original tread material 9 has been worn quite thin, whereas relatively very thick shoulder tread portions remain radially under the edges 10 of the road engaging crown surface.

In carrying out the improved method, the relatively flat road engaging crown surface of the original tread material 9 would usually be prepared for reception of a new tread such as by buffing the same while the casing is in a normal condition such as shown, for example, by dotted lines in Fig. 1. Preferably after the buffing operation is completed, but at any rate before any new tread material is applied, the crown surface of the casing will be circumferentially and radially contracted to the extent desired, and this can most readily be accomplished by laterally spreading the beads 9 while maintaining the same in parallel relation. For this purpose, the casing may be placed on a conventional tire spreader, the spreading arms only of which are shown and indicated by 11 in the drawings. After the casing has been laterally expanded and circumferentially and radially contracted from the more or less normal condition shown by dotted lines in Fig. 1 to the condition shown by full lines in Fig. 1, a band of new tread material 12 in an uncured state is applied to the circumferentially and radially contracted crown of the original tread material. This band of new tread material will usually be cemented to the worn crown.

With the new tread material 12 thus applied to the circumferentially and radially reduced crown of the casing, a suitable mold or curing band may be slipped over the newly treaded but contracted crown as shown, for example, in Figs. 1 and 2. In Figs. 1, 2, 3, and 4, a transversely flat mold of the type disclosed in my prior Patents 1,917,261 and 1,917,262 is illustrated, and in Figs. 1 and 2, the mold is shown as being loosely applied over the tread but contracted casing. This mold, as shown in the drawings, is in the form of a sheet metal ring formed with radially inwardly projecting marginal confining flanges 13 and intermediate design forming flanges 14. A steam coil 15 is shown as applied about the exterior of the mold to heat the same. The confining flanges 13, which are continuous and unbroken, are laterally spaced apart a distance slightly greater than the width of the new tread material 12. After the mold has been properly centered on the treaded and contracted crown, the casing beads 7 are relieved of lateral spreading pressure and the casing will expand radially into tight frictional engagement with the design forming ribs or flanges 14 of the mold. At this point, a conventional air bag or inner tube 16 is placed in the casing and the casing is equipped with a more or less conventional rim 17. With this done, the casing is inflated with air pressure, which will cause the casing to expand radially and force the new tread stock into the cavities of the mold as shown, for example, in Figs. 3 and 4.

It may be assumed that the maximum internal radius of the mold approximates the normal rolling radius of the casing, so that the casing will be cured in this condition. Of course, the new tread is cured by application of heat while the new tread stock is maintained under pressure, and in accordance with the present illustration, the heating of the mold is accomplished by injecting steam through the coil 15 while the desired pressure is obtained by application of internal air pressure to the casing. When the tire has been completely cured, it is removed from the mold by again spreading the beads and the tread will thereafter tend to retain the circumferentially and radially reduced condition in which it was cured. However, when the cured casing is inflated as shown in Fig. 5, the casing will return to its normal or expanded radius condition against the yielding tension of the tread.

By full lines in Fig. 2, it will be seen that the casing which was contracted prior to the application of the new tread stock remains in a round or nearly round shape circumferentially even when circumferentially contracted to the extent necessary to fit the same in the mold and, by dotted lines in the same Fig. 2, attempt has been made to illustrate at 12' the extent of buckling, which often occurs when contracting the crown portions of the previously treaded cases, as was customary hitherto. Of course, this extensive buckling will be reduced somewhat when the newly applied tread material is expanded against the maximum internal diameter surfaces of the mold, but in many instances, the circumferentially spaced buckles in the periphery of the casing will remain to such an extent as to prevent complete contact between the new tread and mold, which of course, results in spongy partially formed sections in the tread. Such a condition is indicated by dotted lines in Fig. 4. In some instances, the buckling will be less extensive and will seemingly be dissipated by the time the casing is inflated to curing pressure, but even in such cases it is often found that pressure between the mold and new tread is so greatly reduced by the buckling tendency as to result in spongy cured tread sections which wear rapidly. Furthermore, the maintaining of any section of the casing under buckling strain during the heating operation is very detrimental to the casing itself and often results in premature blowing of the casing.

The improved method herein described has substantially eliminated the hazards and difficulties arising from the tendency of the casing to buckle under previously employed methods, and has generally increased the standard of work turned out, and has enabled operators to cure treads to a greatly reduced or rolling radius condition on certain sizes and types of tires on which it was not previously practical to cure treads to this circumferentially and radially short condition.

The words "treading" and "retreading" is herein used in a broad sense to cover the application of tread material to any previously cured tire casing, and this without regard to whether the purpose of adding the tread material be to replace tread material that has been worn off or otherwise removed or be simply for the purpose of treading new tire casings.

What I claim is:

1. The method of treading tire casings which consists in contracting the peripheral portion of the tire casing to a materially reduced radius at all points about its circumference, in applying to the circumferentially and radially contracted periphery of the casing an annular band of new tread material, and in subjecting the new tread material to vulcanizing heat and pressure while retaining the newly treaded periphery of the casing in a materially circumferentially and radially contracted condition at all points about its circumference.

2. The method of treading tire casings having worn road engaging tread surfaces which consists in preparing the worn crown surface of the original tread material of the casing for reception of new tread while retaining the casing in a substantially normal shape, in subsequently materially reducing the radius of the prepared crown of the casing at all points about its circumference, in thereafter applying about the prepared radially and circumferentially reduced crown surface of the casing an annular band of new tread material, in next placing the radially and circumferentially contracted newly treaded casing within an annular mold having a maximum internal radius approximating the expected normal rolling radius of the finished casing, in thereafter expanding the newly treaded crown of the casing radially to place the new tread material under pressure, and in finally heating the mold to cure the newly applied tread material to the casing while the same is being retained in said materially radially and circumferentially contracted condition.

3. The method of treading tire casings which consists in spreading the beads of the casing laterally to an extent necessary to very materially reduce the radius of the peripheral crown portion of the casing at all points about its circumference, in applying to the circumferentially and radially contracted periphery of the casing an annular band of new tread material, and in subjecting the new tread material to vulcanizing heat and pressure while retaining the newly treaded periphery of the casing in a materially circumferentially and radially contracted condition at all points about its circumference.

4. The method of treading tire casings which consists in spreading the beads of the casing laterally to an extent necessary to very materially reduce the radius of the peripheral crown portion of the casing at all points about its circumference, in applying to the circumferentially and radially contracted periphery of the casing an annular band of new tread material, in placing the laterally spread radially and circumferentially contracted casing with its newly applied tread material in a circular mold having a radius very materially less than the normal expanded radius of the peripheral portion of the casing, in relieving the beads of the casing from spreading action after the casing is positioned in the circular mold so as to permit the newly treaded periphery of the casing to expand by its own energy into surface contact with the mold, in applying internal expanding pressure to the casing to place the new tread material under pressure between the original casing material and mold, and in finally heating the mold.

PAUL E. HAWKINSON.